US008449207B2

(12) United States Patent
Takabatake et al.

(10) Patent No.: US 8,449,207 B2
(45) Date of Patent: May 28, 2013

(54) THERMAL PRINTER DEVICE WITH LINEARLY DISPLACEABLE THERMAL HEAD

(75) Inventors: Yoshinari Takabatake, Shinagawa (JP); Masafumi Chiba, Shinagawa (JP); Masahiro Tsuchiya, Shinagawa (JP); Yoichi Takamura, Shinagawa (JP); Yukihiro Mori, Shinagawa (JP); Kunihiko Funada, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 431 days.

(21) Appl. No.: 12/314,617

(22) Filed: Dec. 12, 2008

(65) Prior Publication Data

US 2009/0151582 A1 Jun. 18, 2009

(30) Foreign Application Priority Data

Dec. 13, 2007 (JP) ................................ 2007-322400

(51) Int. Cl.
*B41J 11/20* (2006.01)
*B41J 2/315* (2006.01)
*B41J 2/32* (2006.01)
*B41J 2/335* (2006.01)
*B41J 25/304* (2006.01)
*G01D 15/10* (2006.01)

(52) U.S. Cl.
USPC ......................... 400/56; 400/120.16; 347/197

(58) Field of Classification Search
USPC ................ 347/198, 197; 400/120.16, 120.17, 400/56, 57
See application file for complete search history.

(56) References Cited

U.S. PATENT DOCUMENTS

| | | | | |
|---|---|---|---|---|
| 4,342,040 | A * | 7/1982 | Fujita et al. | 347/197 |
| 5,172,137 | A * | 12/1992 | Hongo et al. | 347/198 |
| 5,366,302 | A | 11/1994 | Masumura et al. | |
| 5,694,159 | A | 12/1997 | Kajiya et al. | |
| 5,993,093 | A * | 11/1999 | Schoennauer et al. | 400/621 |
| RE38,473 | E | 3/2004 | Smolenski | |

(Continued)

FOREIGN PATENT DOCUMENTS

| | | |
|---|---|---|
| JP | 03-199069 | 8/1991 |
| JP | 03251478 | * 11/1991 |

(Continued)

OTHER PUBLICATIONS

European Search Report issued in the corresponding European patent application; dated Jun. 16, 2011.

*Primary Examiner* — Judy Nguyen
*Assistant Examiner* — Blake A Tankersley
(74) *Attorney, Agent, or Firm* — Staas & Halsey LLP

(57) ABSTRACT

A printer device having a detachable thermal head, the thermal head being precisely positioned relative to a platen, whereby the printer device is capable of printing characters or the like, of a stable quality, on printing paper having different thickness'. A head module of the printer an attachment member detachably attached to a main frame; a movable support member movable relative to the attachment member; and a thermal head fixedly supported by the movable support member. The movable support member is connected to the attachment member via a plurality of head springs, and has a head positioning protruding portion configured to engage with a head positioning recess portion of the attachment member. The recess portion is formed as a groove which is generally straight, whereby the movable support member and the thermal head 44 may be straightly displaced relative to the attachment member only in the extending direction of the groove.

6 Claims, 8 Drawing Sheets

U.S. PATENT DOCUMENTS

| | | | | |
|---|---|---|---|---|
| 7,281,874 | B2 * | 10/2007 | Watanabe et al. | 400/691 |
| 2004/0080604 | A1 | 4/2004 | Ito | |
| 2005/0078998 | A1 * | 4/2005 | Lien et al. | 400/703 |
| 2007/0059074 | A1 | 3/2007 | Yoshioka | |

FOREIGN PATENT DOCUMENTS

| | | |
|---|---|---|
| JP | 4-294180 | 10/1992 |
| JP | 11-42825 | 2/1999 |
| JP | 11-268375 | 10/1999 |
| JP | 2002-536036 | 10/2002 |
| JP | 2004-114417 | 4/2004 |
| JP | 2007-120370 | 5/2007 |
| JP | 2007-216440 | 8/2007 |
| WO | WO 00/45676 | 8/2000 |

* cited by examiner

THERMAL PRINTER DEVICE WITH LINEARLY DISPLACEABLE THERMAL HEAD

RELATED APPLICATIONS

The present application claims priority from Japanese Patent Application No. 2007-322400, filed on Dec. 13, 2007, the entire content of which is fully incorporated herein by reference.

BACKGROUND OF THE INVENTION

1. Field of the Invention

The present invention relates to a printer device having a thermal head for printing on paper and a platen roll for feeding paper to the thermal head.

2. Description of the Related Art

In a conventional printer, printing paper unwound from a roll of paper is nipped between a platen roller and a thermal head, and printing is carried out by heating the thermal head during the feeding of the paper. For example, Japanese Unexamined Patent Publication No. 3-199069 discloses a line thermal printer in which a rotational shaft of a platen roll is inserted into an U-shaped notch such that the platen roll may be precisely positioned relative to a head in the horizontal and vertical directions.

Japanese Unexamined Patent Publication No. 2004-114417 discloses a printer in which the center of a support shaft of a head for a platen is arranged on an extended head surface and the force of a spring for biasing the head to the platen is applied to the head in the direction perpendicular to the head surface.

Since it is necessary to regularly clean or replace a thermal head used in a thermal printer, it is preferable that the thermal head be easily detachable from a body of the thermal printer. However, it is necessary to precisely position the thermal head relative to a platen during use for printing quality. Therefore, it is not possible to easily make the thermal head detachable from the body. In addition, in recent years, it is desirable that one printer can print characters or the like with stable quality, on printing paper having different thickness' (in particular, thick paper).

In the line thermal printer described in Japanese Unexamined Patent Publication No. 3-199069, the platen is inserted into the U-shaped notch in order to improve the positional accuracy of the platen relative to the fixed thermal head. Therefore, when the thermal head is exchanged, it is necessary to detach the platen and then detach the fixed thermal head, which is troublesome. In the thermal printer described in Japanese Unexamined Patent Publication No. 2004-114417, as the thermal head is rotated about the support shaft, it is not possible to move the thermal head in the direction precisely perpendicular to the surface of the platen when printing paper having different thickness' are used. Therefore, the printing quality may be uneven depending on the thickness of the paper.

SUMMARY OF THE INVENTION

Accordingly, an object of the present invention is to provide a printer device having a detachable thermal head, the thermal head being precisely positioned relative to a platen, whereby the printer device is capable of printing characters or the like, of a stable quality, on printing paper having different thickness'.

According to the present invention, there is provided a printer device comprising: a main frame including a platen roller; and a head module including a thermal head, wherein the head module comprises: an attachment member detachably attached to the main frame; a movable support member for fixedly supporting the thermal head; and a guide mechanism for guiding the movable support member such that the movable support member may be linearly displaced relative to the attachment member, and wherein the direction of the displacement of the movable support member is determined such that the thermal head is moved relative a surface of the platen roller in the direction perpendicular to the surface of the platen roller when the head module is attached to the main frame.

The attachment member of the head module may comprise a grip mechanism for rotatably gripping ends of a rotation shaft of the platen roller when the head module is attached to the main frame, in order to fix the positional relationship between the attachment member and the platen roller.

It is preferable that the attachment member of the head module be pivotably attached to the main frame and the printer device comprises a positioning mechanism for positioning the head module relative to the main frame.

It is preferable that the head module comprises a plurality of springs positioned between the attachment member and the movable support member, each spring being spacingly located in the axial direction of the rotation shaft of the platen roller, a spring constant of each spring being selected such that a head pressure of the thermal head against the platen roller is even in the longitudinal direction of the platen roller.

The plurality of springs may be connected to each other so as to form a substantially single member.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1A:
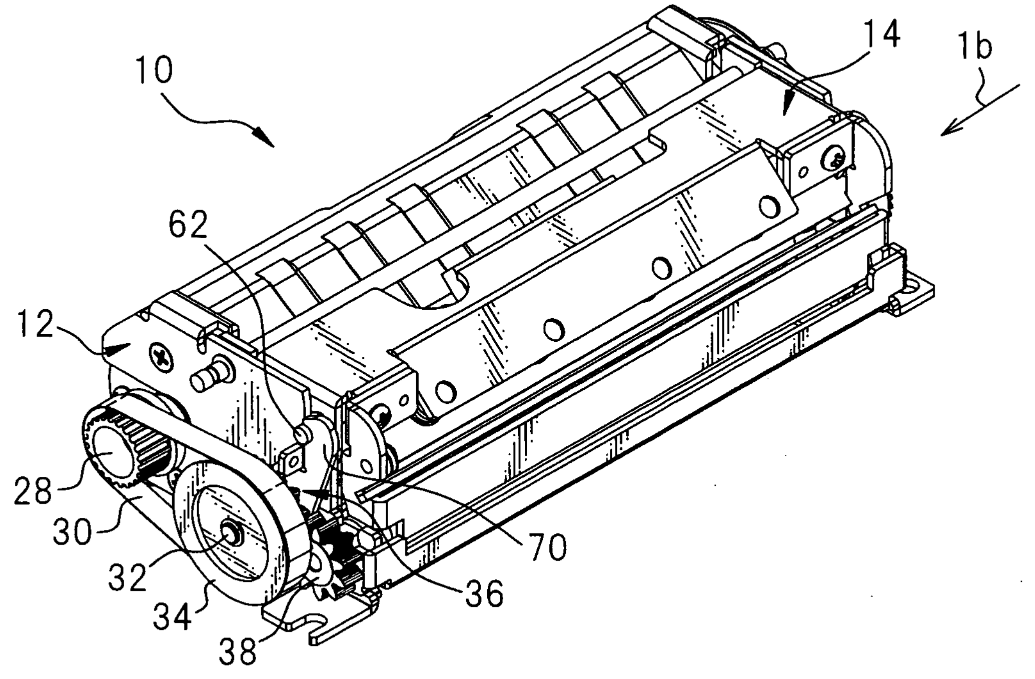
FIG. 1*a* is a perspective view of a printer device of the invention when a head module thereof is assembled.
Figure 2A:
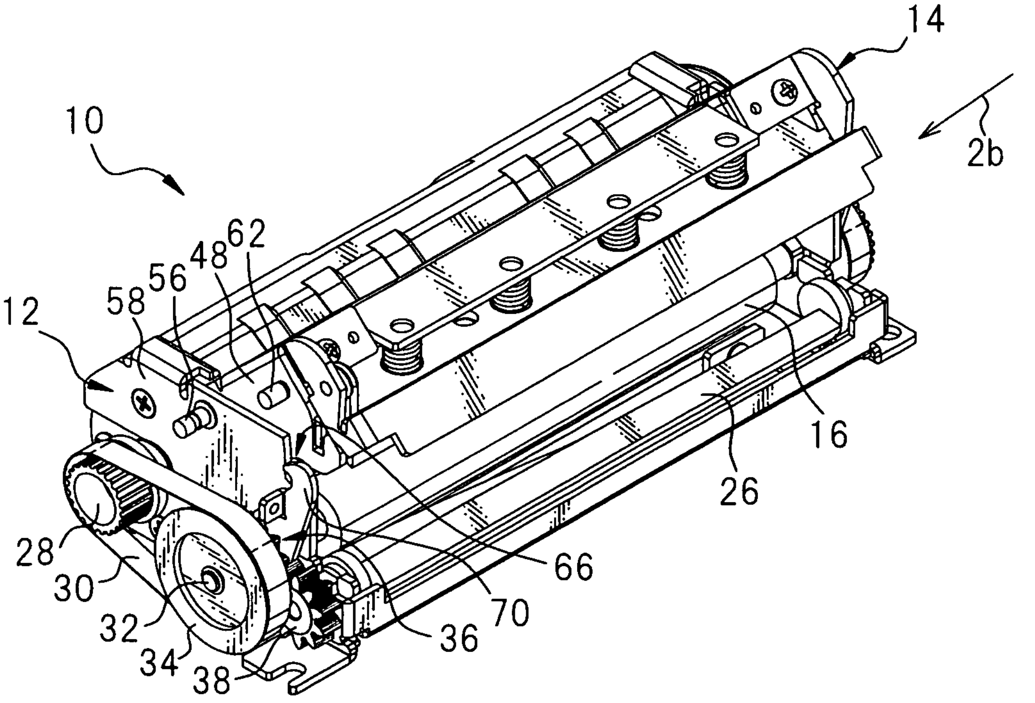
FIG. 2*a* is a perspective view of the printer device of the invention when the head module thereof is detached.

FIG. 1*a* is a perspective view of a thermal printer device 10 according to a preferable embodiment of the invention. Thermal printer 10 has a main frame 12 and a head module 14 configured to detachably attached to main frame 12, as shown in FIG. 2*a*. A platen roller (hereinafter, referred to as "platen") 16 having a rubber roller is contained in main frame 12, and platen 16 is rotatably driven by a pulse motor (not shown). Output power of the pulse motor is transmitted to platen 16 via a first pulley 18 (see FIG. 2*b*) coupled to an output shaft of the pulse motor, a first timing belt 20, and a second pulley 24 attached to a first shaft portion 22 of platen 16.

As shown in FIG. 2*a*, a rotary cutter 26 for cutting printing paper (not shown) is contained in main frame 12, and rotary cutter 26 is rotatably driven by a pulse motor (not shown). Output power of the pulse motor is transmitted to rotary cutter 26 via a third pulley 28 coupled to an output shaft of the pulse motor, a second timing belt 30, a fourth pulley 34 attached to a second shaft portion 32 of platen 16, a first gear 36 formed integrally with fourth pulley 34, and a second gear 38 engaged with first gear 36.

Figure 3A:
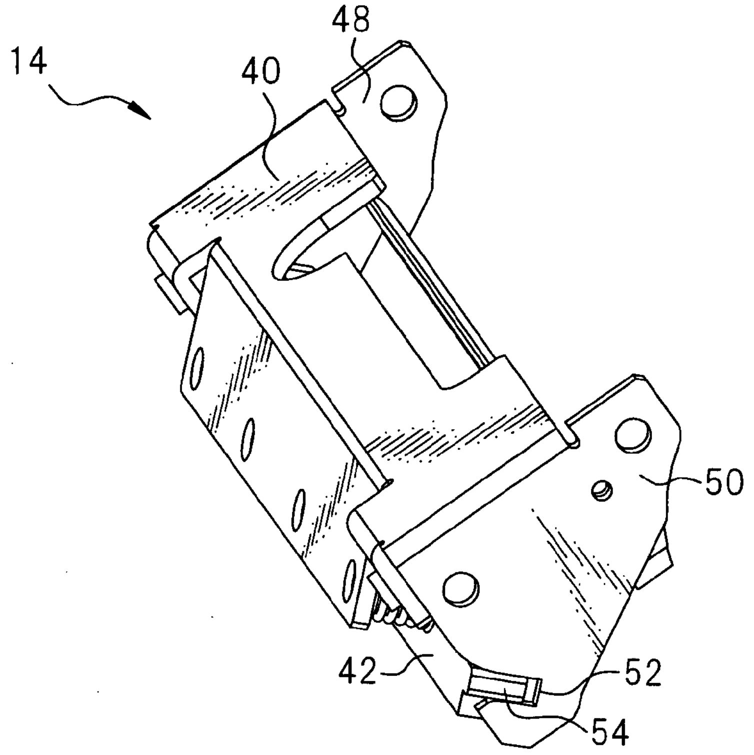
FIG. 3*a* is a perspective view of a head module of the invention.
Figure 3B:
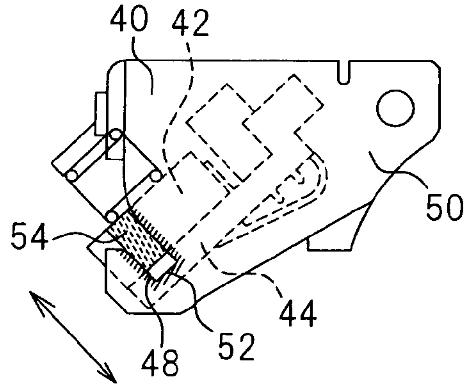
FIG. 3*b* is a side view of the head module of FIG. 3*a;*
Figure 3C:
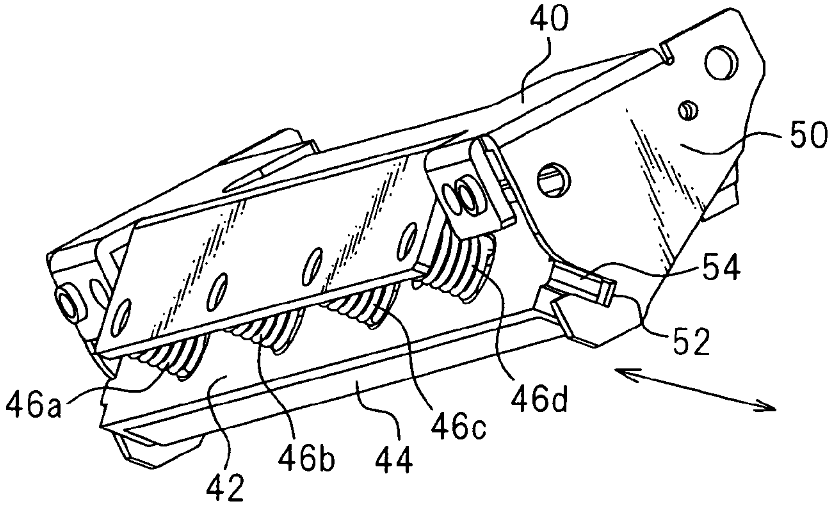
FIG. 3*c* is a perspective view of the head module of FIG. 3*a* viewed in the direction different from that of FIG. 3*a;*

FIGS. 3*a* to 3*c* show head module 14 viewed from different directions. Head module 14 has a an attachment member 40 detachably attached to main frame 12, a movable support member 42 movable relative to attachment member 40, and a thermal head 44 fixedly supported by movable support member 42. Movable support member 42 is connected to attachment member 40 by means of a plurality of (four in the embodiment) head springs 46*a*, 46*b*, 46*c* and 46*d*. Head springs are positioned between attachment member 40 and movable support member 42, and each head spring is spacingly located in the width direction (or the axial direction of the rotation shaft of platen 16). Although the head spring is a coil spring, another type of spring, such as a plate spring may also be used. Movable support member 42 has protruding portions for positioning the head configured to engage with recess portions formed on side plates 48, 50 of attachment member 40. In FIGS. 3*a* to 3*c*, only a recess portion 52 formed on side plate 50 and a protruding portion 54 capable of engaging with recess portion 52 are illustrated. As shown, recess portion 52 is formed as a groove which generally straightly extends, whereby movable support member 42 and thermal head 44 fixed to support member 42 may be straightly displaced relative to attachment member 40 only in the extending direction of recess portion or groove 52. In other words, recess portion 52 and protruding portion 54 cooperatively constitute a guide mechanism for determining the direction of movement of thermal head 44 relative to attachment member 40. In addition, the extending direction of groove 52 is perpendicular to the longitudinal direction of platen 16, in the state of FIG. 1*a* in which head module 14 is assembled with main frame 12.

Figure 1B:
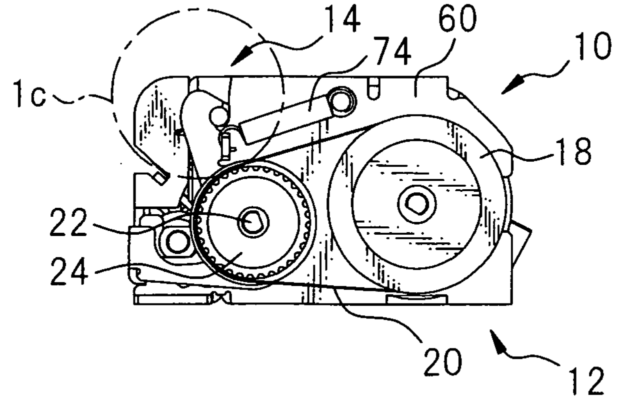
FIG. 1*b* is a side view viewed in the direction of an arrow 1*b* of FIG. 1*a;*
Figure 1C:
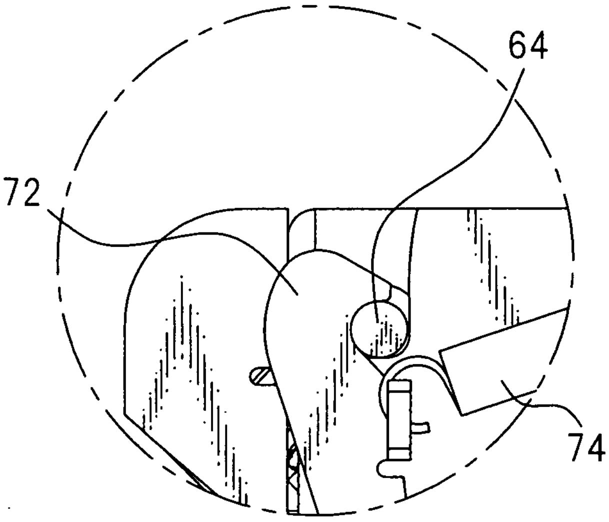
FIG. 1*c* is an enlarged view of a part 1*c* of FIG. 1*b;*
Figure 2B:
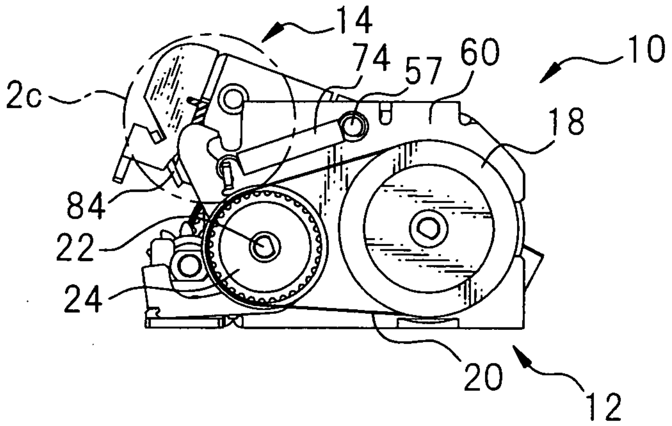
FIG. 2*b* is a side view viewed in the direction of an arrow 2*b* of FIG. 2*a;*
Figure 2C:
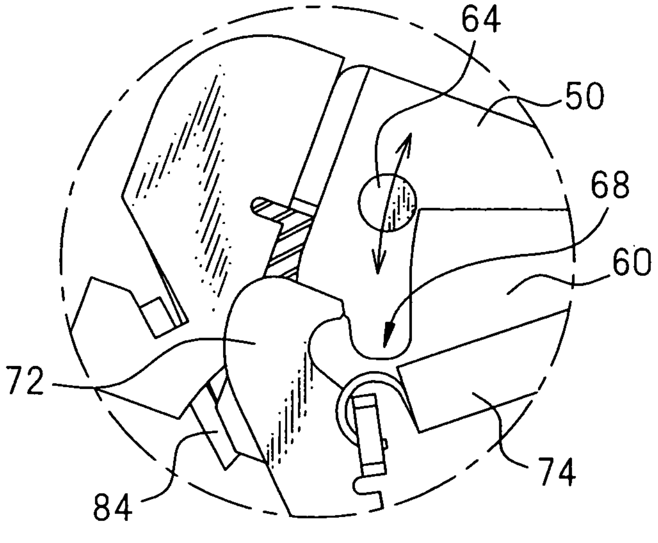
FIG. 2*c* is an enlarged view of a part 2*c* of FIG. 2*b;*

FIGS. 2*a* to 2*c* show the detail of the positioning mechanism for head module 14 relative to main frame 12. First, side plates 48, 50 of head module 14 are pivotably connected to side plates 58, 60, respectively, by means of pivot pins 56, 57. Head module positioning pins 62, 64 are arranged on side plates 48, 50 of attachment member 40 of head module 14, respectively, and positioning pins 62, 64 engage with head module positioning grooves 66, 68, respectively, having generally U-shape and formed on side plate 58, 60 of main frame 12. When each positioning pin reaches a reference position (for example, the bottom) of corresponding positioning groove, as shown in FIG. 1*c*, head module locking hooks 70, 72 engage with positioning pins 62, 64, respectively, so as to lock head module 14 to main frame 12. Due to this, head module 14 is precisely positioned relative to main frame 12 and assembled with main frame 12. In addition, as shown in FIG. 1*b*, it is preferable that biasing means such as coil springs are arranged on side plates 58, 60 of main frame 12 configured to bias corresponding locking hooks 70, 72, respectively, in the direction along which each locking pin locks corresponding positioning pin. In FIG. 1*b*, only a coil spring 74 for locking hook 72 is illustrated. Due to this, each locking hook is prevented from unexpectedly unlocking a corresponding pin.

As shown in FIGS. 1*a* to 1*c* and 3*a* to 3*c*, the extending direction of head positioning groove 52 is perpendicular to the longitudinal direction of platen 16 when head module 14 is assembled with main frame 12. Further, thermal head 44 is linearly moved from the center of platen 16 when viewed in a radial cross section of platen 16. In other words, thermal head 44 is not rotated about one axis, but is moved relative to platen 16 in the direction perpendicular to the surface of platen 16. Due to this, even when printing paper to be printed has the thickness of 200-250 μm, as well as the normal thickness of 100 μm, the position of thermal head 44 may be properly adjusted relative to platen 16, whereby the stable printing quality may be ensured.

Figure 4A:
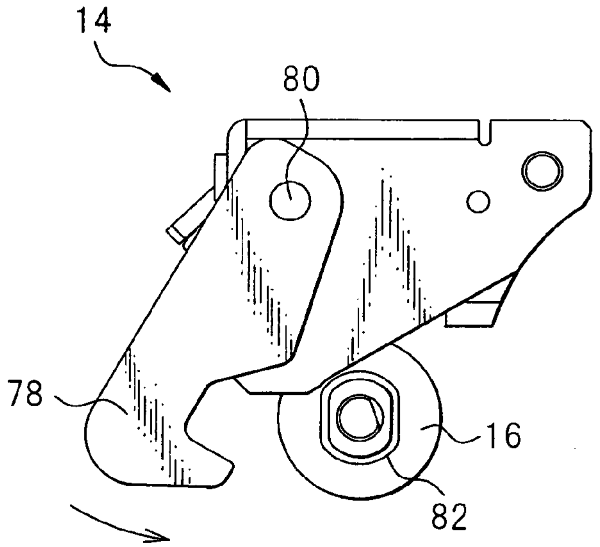
FIG. 4*a* is a side view of the head module which is not engaged with a platen roller.
Figure 4B:
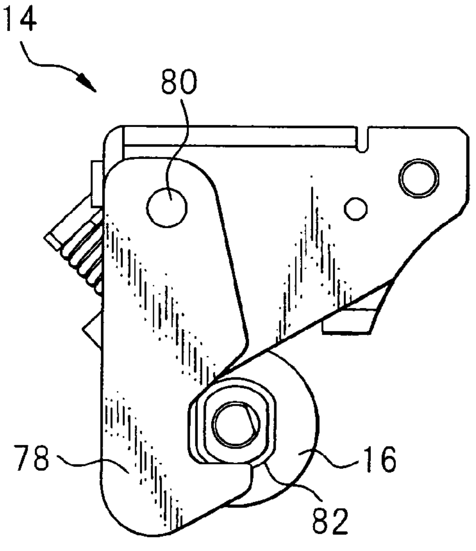
FIG. 4*b* is a side view of the head module which is engaged with the platen roller.
Figure 5:
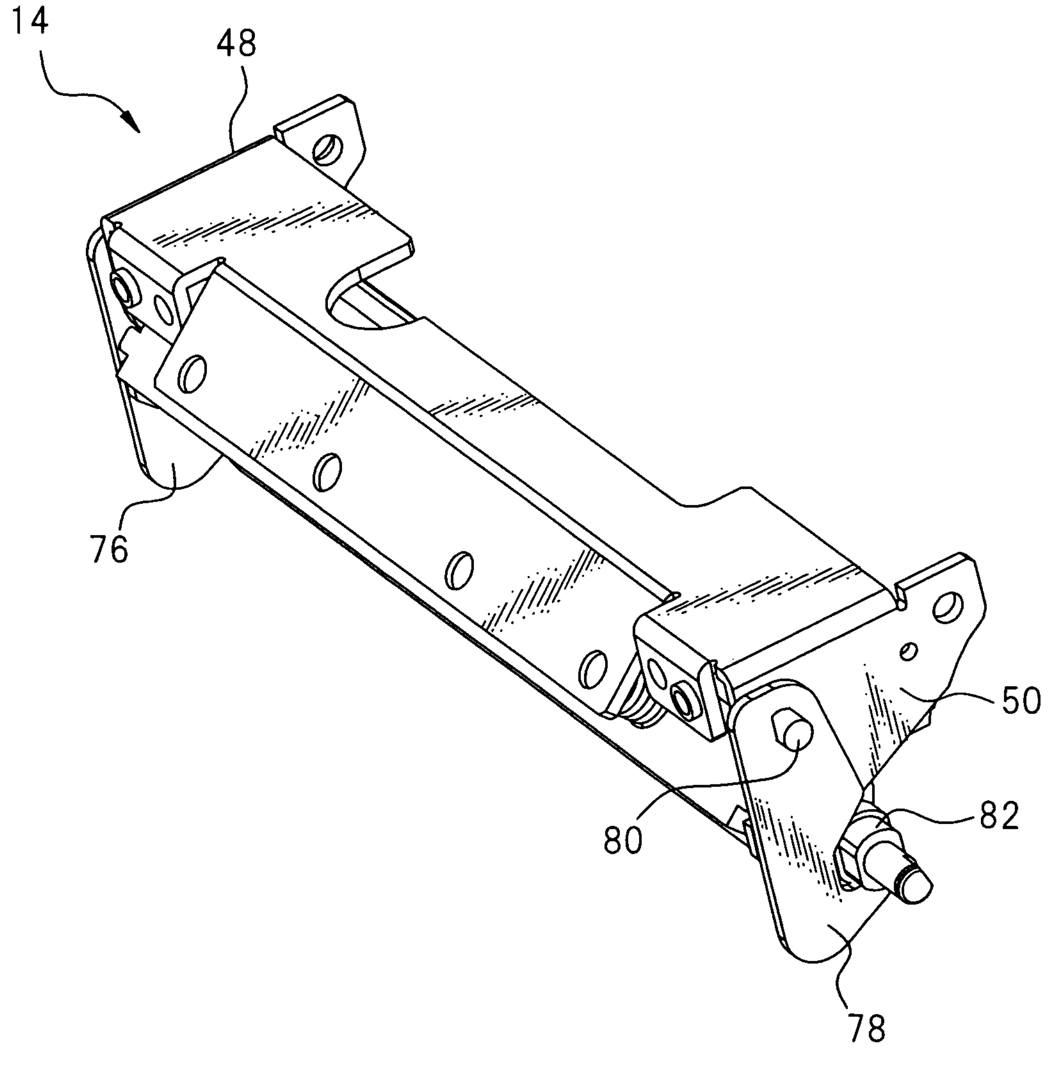
FIG. 5 is a perspective view of the head module and the platen roller of FIG. 4*b;*

FIGS. 4*a*, 4*b* and 5 show the positional relation between head module 14 and main frame 12 when they are assembled as shown in FIG. 1*a*. As shown in FIG. 5, on side plates 48, 50 of attachment member 40 of head module 14, platen locking hooks 76, 78 are arranged, respectively, which may serve as a grip mechanism for rotatably gripping ends of a rotation shaft of platen 16. Platen locking hooks 76, 78 are rotatably connected to rotation axes (only a rotation axis 80 is illustrated in FIGS. 4*a* and 4*b*) arranged on side plates 48, 50, respectively. Hooks 76, 78 are configured to grip bearings (only a bearing 82 is illustrated in FIGS. 4*a* and 4*b*) attached to both ends of platen 16 in the state of FIG. 1*a*. In other words, attachment member 40 is fixed to the rotation shaft of platen 16. Due to this, a head pressure or a pressure generated by head springs 46*a* to 46*d* is applied to head module 14 only. Therefore, even when head module 14 is replaced with another head module including a plurality of head springs having the different spring constants, it is only necessary to adjust the strength of a rubber roller of platen 16. Accordingly, it is sufficient that the strength of main frame 12 can support the weight of head module 14 and platen 16, whereby the same main frame may be applied to a head module having the different head pressure.

In the above embodiment, a movable blade or rotary cutter 26 is positioned in main frame 12, and a fixed blade 84 functioning cooperatively with the movable blade is fixed to attachment member 40 of head module 14 (see FIGS. 2*b* and 2*c*). Alternatively, a rotary blade may be formed integrally with the head module and a fixed blade may be arranged in the main frame. Due to this, maintenance of the rotary cutter is easier, particularly when a rotary cutter is more easily worn than a fixed blade.

Figure 6:
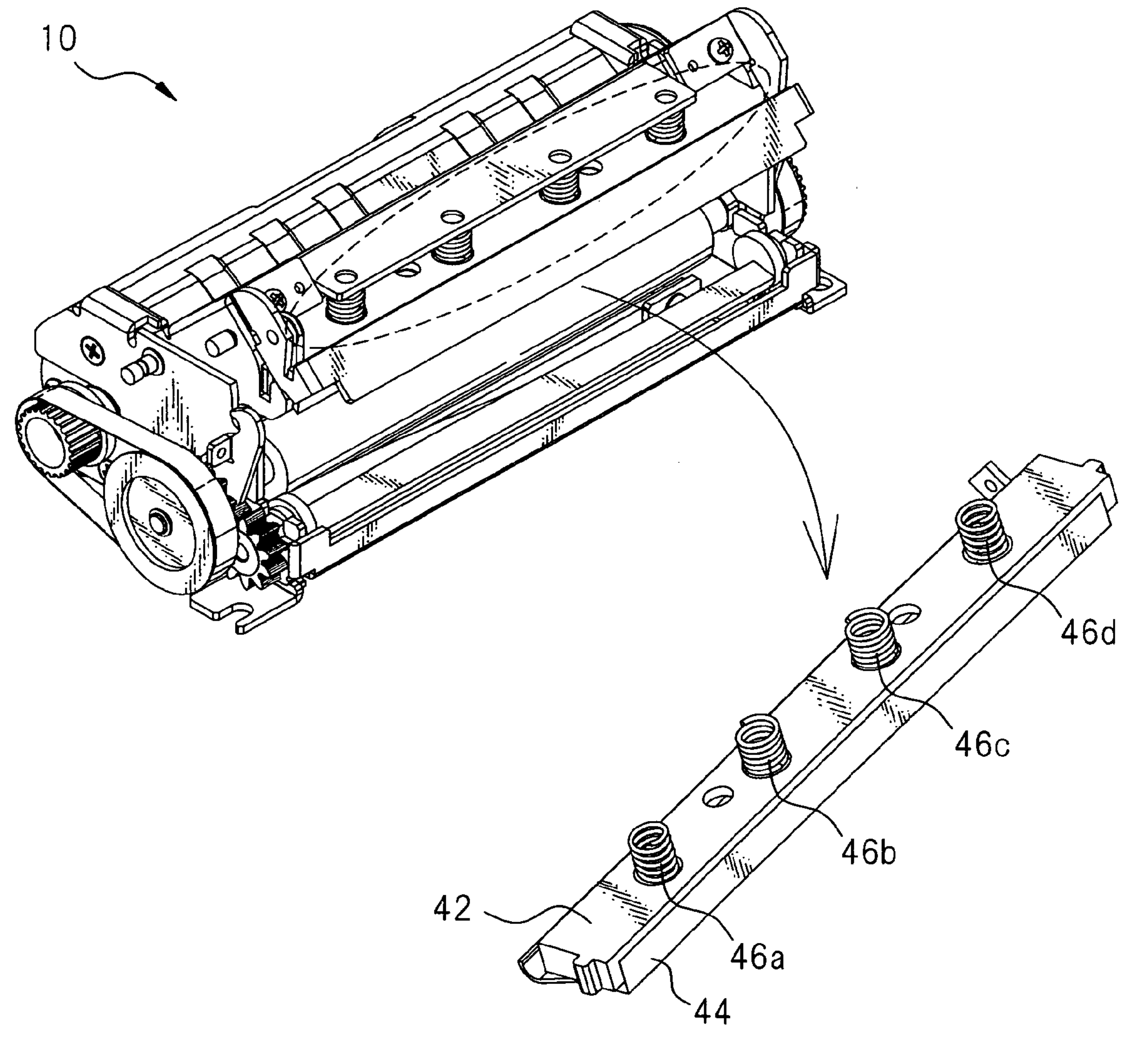
FIG. 6 is a perspective view of a movable support member and head springs of the printer device of the invention.

Depending on the manufacturing accuracy of thermal head 44 and movable support member 42, and/or the degree of thermal deformation of the thermal head during use, the head pressure of thermal head 44 against platen 16 may be uneven in the longitudinal direction of the platen. Then, a spring constant of each of the plurality of head springs 46*a* to 46*d* may be properly selected such that the spring constant of each spring is different from each other. For example, in the embodiment of FIG. 6, two inner springs or springs 46*b* and 46*c* have a relatively low spring constant, and two outer springs or springs 46*a* and 46*d* have a relatively high spring constant. Due to this, when movable support member 42 is deformed or curved by the application of heat to thermal head 44, the outer springs having relatively high spring constant may reduce the deformation of the outer side of the movable support member which is widely deformed. Further, when the above manufacturing accuracy and the thermal deformation are previously empirically estimated, the spring constant of each head spring may be properly determined. In addition, when the springs have different constants, the springs are prevented from being assembled incorrectly by using different colors and/or shapes for the springs, corresponding to the spring constants thereof.

Figure 7:
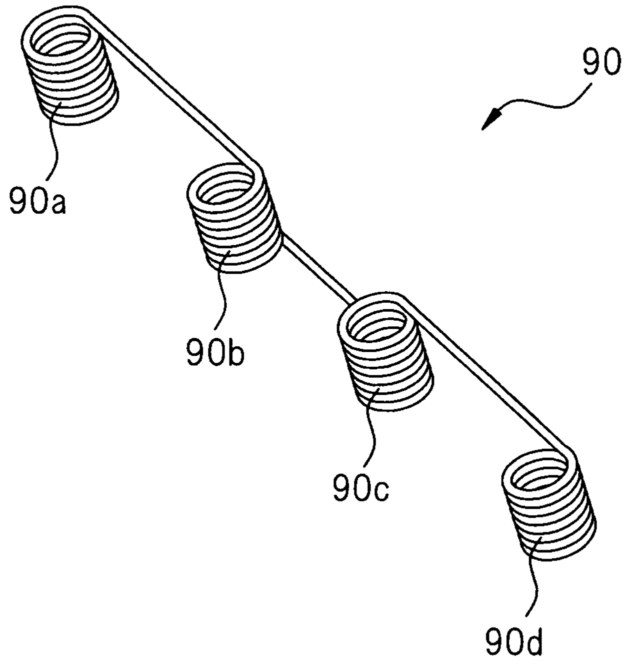
FIG. 7 is a perspective view showing another preferable configuration of the head springs.

As shown in FIG. 7, the plurality of head springs may be formed as a substantially single member. A spring assembly 90 as shown in FIG. 7 has coil spring portions 90*a*, 90*b*, 90*c* and 90*d*. In spring assembly 90, one end of spring portion 90*a* is connected to one end of spring portion 90*b*, the other end of spring portion 90*b* is connected to one end of spring portion 90*c*, and the other end of spring portion 90*c* is connected to one end of spring portion 90*d*. Such a spring assembly may be constituted by connecting each coil spring portion by means of a straight wire or the like having a proper length, alternatively, by deforming one wire such that the wire has the spring portions spaced from each other by a proper distance. By forming the head springs as a substantially single member, assembling of the head module is easier.

As described above, it is necessary to regularly clean or replace the thermal head used in the thermal printer. Therefore, if the thermal head or a section including the thermal head is formed as a module, the maintenance of the thermal printer becomes easier. However, it is necessary to precisely position the thermal head relative to the platen, and further, the thermal printer is required to be capable of printing on relatively thick printing paper. Thus, the present invention provides a mechanism for precisely positioning the head module including the thermal head relative to the platen while the head module is detachable from the platen. Further, the direction of movement of the movable support member relative to the attachment member is limited to the direction perpendicular to the longitudinal direction of the platen, whereby various printing paper having the different thicknesses' may be properly printed by the thermal printer according to the invention.

By providing the grip mechanism gripping the ends of the rotation shaft of the platen roller to the attachment member, the head module is substantially integral with the platen roller. Therefore, it is not necessary to take the strength of the main frame into consideration when the head pressure of the thermal head applied to the platen roller is varied. In other words, it is only necessary to adjust the strength of the platen roller even when the head pressure is varied, which is advantageous in relation to a design of the thermal printer.

By pivotably attaching the attachment member of the head module to the main frame and using the positioning mechanism of the head module relative to the main frame, the head module may be easily and precisely attached to the main frame.

By providing the plurality of head springs, each spaced from each other along the rotation axis of the platen, to the head module, the unevenness of the head pressure of the thermal head, due to the manufacturing accuracy and/or the thermal deformation of the thermal head, may be reduced or eliminated by varying the spring constant of each spring.

By connecting the plurality of head springs so as to form a substantially single member, assembling of the head module becomes easier.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A printer device comprising:

a main frame including a platen roller; and a head module including a thermal head, wherein the head module comprises:

an attachment member detachably attached to the main frame;

a movable support member for fixedly supporting the thermal head; and a guide mechanism for guiding the movable support member such that the movable support member may be linearly displaced relative to the attachment member, wherein the direction of the displacement of the movable support member is determined such that the thermal head is moved relative to a surface of the platen roller in one direction perpendicular to the surface of the platen roller when the head module is attached to the main frame, and wherein the guide mechanism includes a straight groove, formed on one of the attachment member and the movable support member and having an open end in the one direction perpendicular to the surface of the platen roller, the open end being opened in an extending direction of the straight groove, and a protruding portion, configured to engage the groove through the open end such that the movable support member can be disengaged from the attachment member by moving the movable support member in only the extending direction of the straight groove, formed on the other of the attachment member and the movable support member, a cross section of the protruding portion, in the direction perpendicular to a longitudinal direction of the platen roller, having an elongated shape extending in a longitudinal direction of the straight groove, a moving direction of the thermal head relative to the surface of the platen roller being limited to the one direction perpendicular to the surface of the platen roller due to the groove.

2. The printer device as set forth in claim 1, wherein the attachment member of the head module comprises a grip mechanism for rotatably gripping ends of a rotation shaft of the platen roller when the head module is attached to the main frame, in order to fix the positional relationship between the attachment member and the platen roller.

3. The printer device as set forth in claim 1, wherein the attachment member of the head module is pivotably attached to the main frame, and the printer device comprises a positioning mechanism for positioning the head module relative to the main frame.

4. The printer device as set forth in claim 1, wherein the head module comprises a plurality of head springs positioned between the attachment member and the movable support member, each head spring being spacingly located in the axial direction of the rotation shaft of the platen roller, a spring constant of each head spring being selected such that a head pressure of the thermal head against the platen roller is even in the longitudinal direction of the platen roller.

5. The printer device as set forth in claim 4, wherein a plurality of coil spring portions corresponding to the plurality of head springs are connected to each other so as to form a single spring assembly.

6. The printer device as set forth in claim 1, wherein an extending direction of the groove is perpendicular to the longitudinal direction of the platen roller while the head module is assembled with the main frame.

* * * * *